T. E. MURRAY.
SHEET METAL VEHICLE WHEEL.
APPLICATION FILED JUNE 15, 1918.
1,350,827.
Patented Aug. 24, 1920.
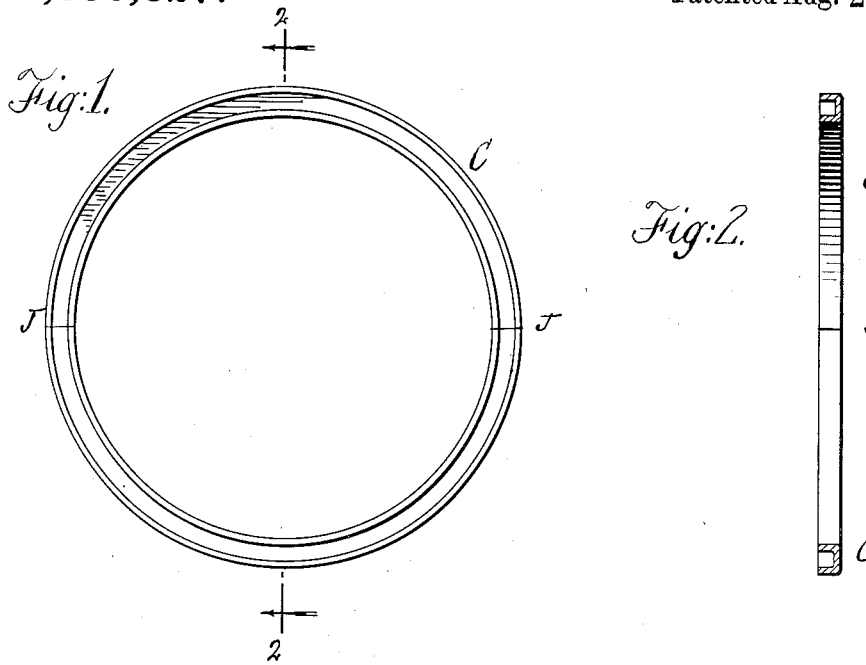
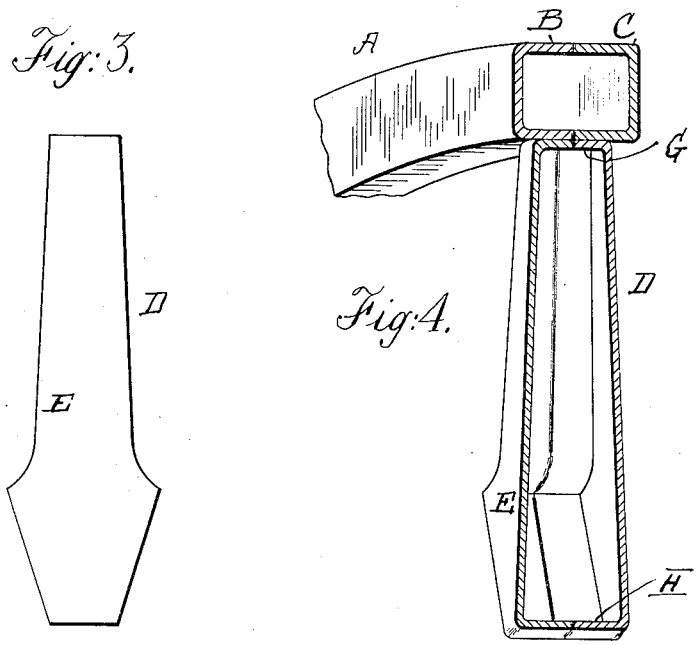

UNITED STATES PATENT OFFICE.

THOMAS E. MURRAY, OF NEW YORK, N. Y.

SHEET-METAL VEHICLE-WHEEL.

1,350,827.  Specification of Letters Patent.  Patented Aug. 24, 1920.

Application filed June 15, 1918. Serial No. 240,117.

*To all whom it may concern:*

Be it known that I, THOMAS E. MURRAY, a citizen of the United States, residing at New York, in the county of New York and State of New York, have invented a certain new and useful Improvement in Sheet-Metal Vehicle-Wheels, of which the following is a specification.

The invention is a sheet metal vehicle wheel which is formed integrally and solely of a felly and a suitable number of spokes. The felly is a closed tube and complete in itself. Each spoke is a closed tube and complete in itself. The felly and spokes are made of struck up sheet metal, and preferably as hereinafter described. Both are very light, but by reason of their everywhere continuous inclosing walls and the shapes thereof are very strong. The spokes are rendered integral with the felly by electrically welding their end walls to the inner circumferential wall of said felly. The spokes are rendered integral with one another by electrically welding their inner end portions together laterally to form the wheel nave. Thus the whole wheel structure becomes integral.

In the accompanying drawings—

Figure 1 is a face view of a half section of the felly struck up in one piece. Fig. 2 is a section on the line 2, 2 of Fig. 1. Fig. 3 is a face elevation of one of the spokes. Fig. 4 is a section through the felly and one of the spokes.

Similar letters of reference indicate like parts.

The felly A is of sheet metal, tubular and closed. It may be formed in two sections B, C, each circular and trough-shaped. The said sections may be struck up in suitable dies, and, therefore, be exactly alike. Their edges are placed in registry and electrically welded, so that the resulting tubular felly is integral.

Each spoke D is formed of two longitudinal sections E, F, struck up in suitable dies and, therefore, exactly alike. Each half section is trough-shaped and has end walls G, H. The edges of the half sections are placed in registry and electrically welded, so that the resulting spoke is integral, tubular and closed. At its inner portion the spoke is of frusto-wedge shape, so that when the several spokes are assembled with their inclined lateral faces in contact, the said frusto-wedge shaped portions being united form the wheel nave, substantially as shown, for example, in U. S. Letters Patent No. 1,220,768, granted to me March 27, 1917.

It is to be noted that the felly and each spoke has a continuous wall, without any necessary opening or perforation. Therefore no water, moisture or mud can enter. The outer end wall of each spoke is made integral by electrical welding with the inner circumferential wall of the felly, as shown in Fig. 4, so that there is produced at the place of junction a wall of greater thickness than the metal elsewhere, and thus the said place of junction is greatly strengthened.

Instead of making each circular half section of the felly as a unit, I may make said half section in two or more arc-shaped units integrally united by electrically welding them together end to end. Thus in Figs. 1 and 2, I may form the half section there shown of two separate semi-circular units integrally formed by electrical welding at the joints J.

I claim:

1. An integral sheet metal wheel felly formed of two struck up circular trough-shaped half sections placed with their edges in registry and electrically welded together at said edges to form an endless tube, each of said half sections being formed of a plurality of arc-shaped units electrically welded together at their ends.

2. A sheet metal wheel, comprising integrally a felly in endless tubular form and a spoke in elongated box form, the wall at one end of said spoke being electrically welded to the inner circumferential wall of said felly to produce a wall of increased thickness at the junction of felly and spoke.

In testimony whereof I have affixed my signature in presence of two witnesses.

THOMAS E. MURRAY.

Witnesses:
 GERTRUDE T. PORTER,
 MAY T. McGARRY.